United States Patent [19]

Tiefenthaler

[11] 4,412,671
[45] Nov. 1, 1983

[54] PLATE VALVE

[75] Inventor: Edelbert Tiefenthaler, Elgg, Switzerland

[73] Assignee: Sulzer Brothers Limited, Winterthur, Switzerland

[21] Appl. No.: 320,101

[22] Filed: Nov. 10, 1981

[30] Foreign Application Priority Data

Nov. 26, 1980 [CH] Switzerland .......................... 8745/80

[51] Int. Cl.³ ..................... F16K 25/00; F16K 31/122
[52] U.S. Cl. ......................................... 251/31; 92/30;
   92/181 P; 251/63; 251/167; 251/175; 251/327
[58] Field of Search ................... 92/30, 181 P, 181 R;
   251/31, 63, 327, 328, 329, 175, 324, 158, 167

[56] References Cited

U.S. PATENT DOCUMENTS

| 430,089 | 6/1890 | Sewall | 251/31 |
|---|---|---|---|
| 2,093,634 | 9/1937 | Cordes | 92/30 |
| 2,417,353 | 3/1947 | Crane et al. | 92/30 |
| 2,605,079 | 7/1952 | Miller et al. | 251/31 |
| 2,742,879 | 4/1956 | Kieser | 92/181 R |
| 2,936,996 | 5/1960 | Mercer | 251/31 |
| 2,964,291 | 12/1960 | Williams et al. | 251/327 |
| 3,071,343 | 1/1963 | Milleville | 251/175 |
| 3,635,436 | 1/1972 | Tillman | 251/31 |
| 4,010,928 | 3/1977 | Smith | 251/31 |
| 4,255,930 | 3/1981 | Natalie | 92/181 P |

FOREIGN PATENT DOCUMENTS 2277485  1/1976  France .

Primary Examiner—George L. Walton
Attorney, Agent, or Firm—Kenyon & Kenyon

[57] ABSTRACT

The plate valve has a housing forming an inlet spigot and an outlet spigot. A movable valve member provided with a closure plate and an orifice plate is movable radially of the spigots via servo-pistons which are rigidly connected to the valve member. The pistons are guided in cylinders disposed diametrically opposite one another on the spigots. The cylinders may be integrally formed with the plate valve housing or may be separably formed as cylinder heads.

7 Claims, 3 Drawing Figures

PLATE VALVE

This invention relates to a plate valve.

As is known, plate valves have been constructed with a vavle member which is movable substantially radially with respect to an inlet spigot and an outlet spigot. Usually, the valve member is constructed to have at least one closure plate for closing off the spigots and an orifice plate which permits communication between the spigots. In order to move the valve member so that one or the other of the closure plate and orifice plate are properly located, use has been made of a servo-piston system. In many cases, the valve member has been connected to the servo-piston system via a stuffing box. However, a plate valve of this type, together with the drive therefore, has been relatively bulky, as well as correspondingly heavy and expensive.

Accordingly, it is an object of this invention to provide a plate valve of relatively small volume and light weight.

It is another object to the invention to provide a plate valve which is relatively inexpensive to manufacture.

Briefly, the invention provides a plate valve which is comprised of a housing, a valve member and a servo-piston system for moving the valve member in the housing. The housing has an inlet spigot with a sealing surface and an outlet spigot with a sealing surface while the valve member is movably mounted in the housing between and radially of the spigots. In addition, the valve member includes at least one closure plate for selectively seating against one of the sealing surfaces to close the spigots from each other and an orifice plate for selectively communicating these spigots with each other.

In accordance with the invention, the servo-piston system includes a pair of cylinders which are disposed in diametrically opposed relation about the spigots as well as a pair of pistons each of which is disposed in a respective cylinder and which is fixed to the valve member.

One advantage of a plate valve of this construction is that the center of gravity of a valve, together with the drive, is situated close to or even on the spigot axis. Consequently, in the event of an induced vibration, particularly in the case of earthquakes, stresses are greatly reduced. Further, it is much easier to prove that these stresses are permissible.

In one embodiment, the spigots and the cylinders are integral so as to form an undivided housing. In this case, the system also includes covers for closing over the respective cylinders. This construction is advantageous in the sense of construction and manufacture particularly when use is made of a forging as the basic material.

In this embodiment, a chamber of one of the cylinders communicates with the inlet spigot in order to receive a flowable medium therefrom. In addition, the system includes a valve which selectively connects the other cylinder chamber with a pressure medium at a pressure different from the pressure of the medium in the inlet spigot. With this construction, the external medium cannot penetrate into the medium which is to be controlled by the plate valve.

In another embodiment, the housing includes a pair of shell parts which are connected with the spigots while each cylinder is in the form of a cylinder head which is removably mounted on the housing. This embodiment provides a plate valve of lighter construction which is particularly suitable for moderate and low pressures.

These and other objects and advantages of the invention will become more apparent from the following detailed description taken in conjunction with the accompanying drawings wherein.

Figure 1:
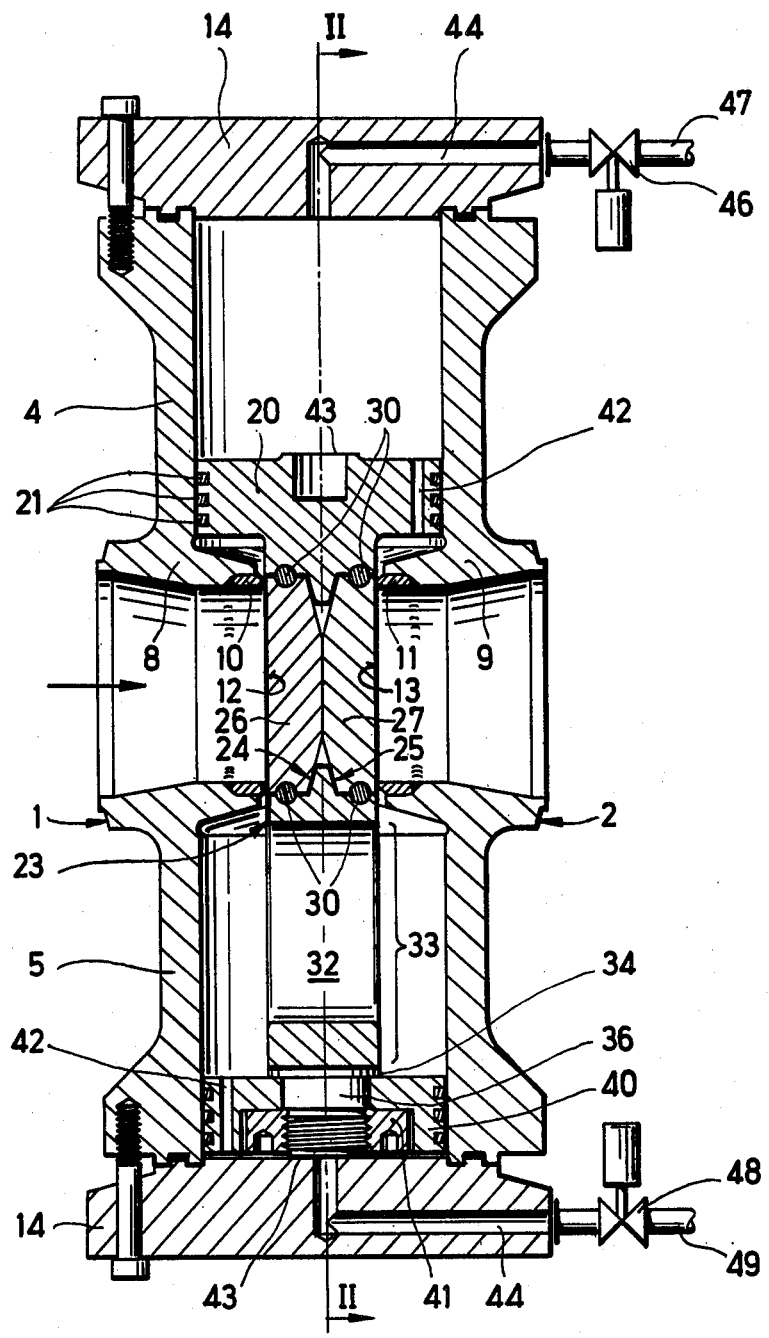
FIG. 1 illustrates an axial cross-sectional view of a plate valve constructed in accordance with the invention.
Figure 2:
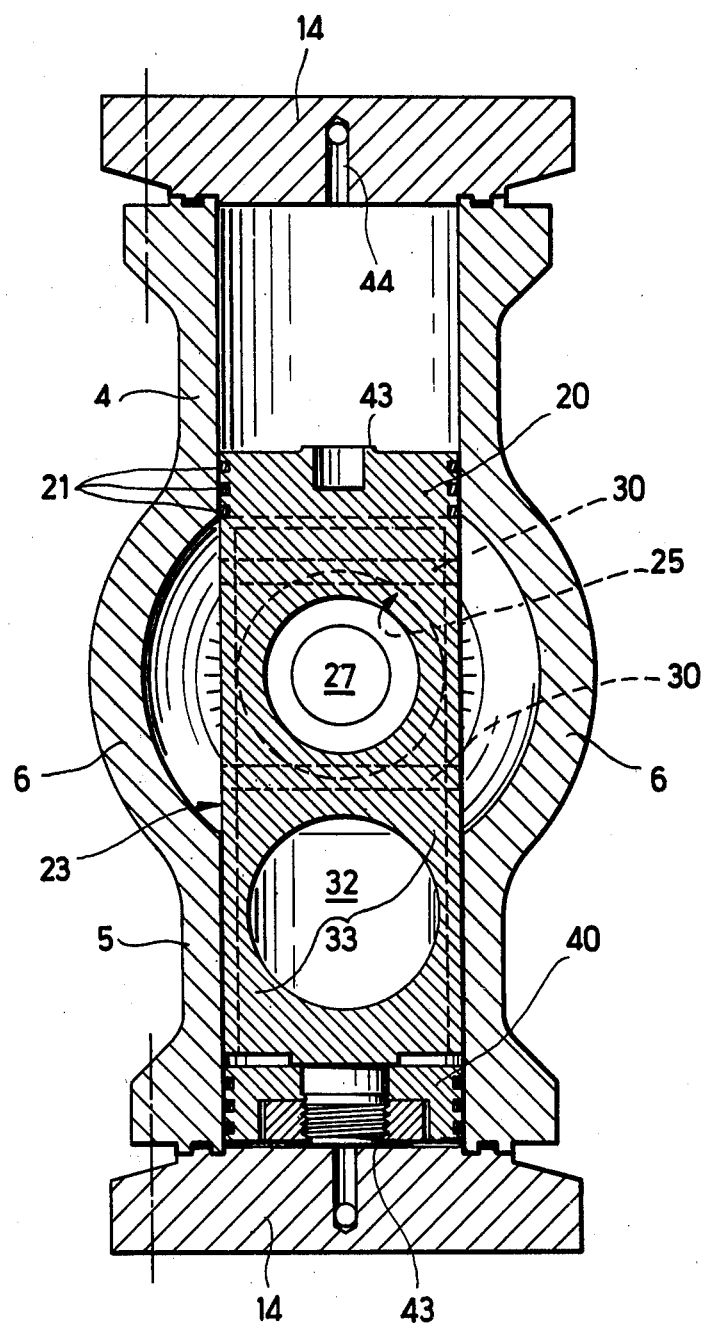
FIG. 2 illustrates a view taken on line II—II of FIG. 1.

Referring to FIGS. 1 and 2, the plate valve has a housing which forms an inlet spigot 1, an outlet spigot 2, a top cylinder 4, a bottom cylinder 5 and two spherical shells 6. As indicated, in FIG. 1, each of the spigots 1, 2 projects into the interior of the housing via a cylindrical part 8, 9, respectively. In addition, a pair of seat rings 10, 11 are welded into the parts 8, 9 on the inside of the housing so as to form sealing surfaces 12, 13 at the free ends. In addition, each of the cylinders 4, 5 is covered by a flat cover 14 whereby each cylinder 4, 5 forms a chamber.

The plate valve also has a valve member 23 which is movably mounted in the housing between and radially of the spigots 1, 2. As shown in FIG. 1, the valve member 23 has two recesses 24, 25 which receive a pair of closure or sealing plates 26, 27 for selectively seating against one or the other of the sealing surfaces 12, 13 in order to close the spigots 1, 2 from each other. In the position illustrated, the plates 26, 27 have a slight clearance in the axial direction of the spigots 1, 2 and are each held loosely in the recesses 24, 25 by a pair of tangentially extending bolts 30. In addition, the valve member 23, has an orifice plate 33, defining a bore 32 for selectively communicating the spigots 1, 2 with each other when the valve member 23 is in a raised position.

The lower end of the valve member 23 carries a machine turned surface 34 and a screw bolt 36.

The plate valve also includes a servo-piston system for moving the valve member 23 within the housing. This system includes not only the cylinders 4, 5 which are disposed in diametrically opposed relation about the spigots 1, 2 but also a pair of pistons 20, 40. As indicated, the top cylinder 4 contains the piston 20. This piston 20 has three piston rings 21 about the outer circumference and is rigidly connected to the valve member 23. The bottom cylinder 5 contains the piston 40. This piston 40 also has three piston rings on the outer periphery and is rigidly connected to the valve member 23 via a countersunk nut 41 which threads onto the screw bolt 36.

The two pistons 20, 40 each have a throttle bore 42 connecting the opposite sides of the pistons to one another. In addition, back seats 43 which cooperate with sealing surfaces on the covers 14 are provided on the end faces of the piston 20 and of the screw bolt 36.

Each cover 14 is formed with a connecting bore 44 which extends at an angle and which is connected, outside the cover 14, to a lower-pressure chamber (not shown) via a solenoid valve 46, 48 respectively and a connecting line 47, 49 respectively.

The plate valve is shown in the closed position in FIGS. 1 and 2. During operation, should a high pressure occur in the spigot 1, the differential pressure occurring presses the plate 27 against the sealing surface 13. The left-hand plate 26, as viewed, then has a clearance with respect to the sealing surface 12. Thus, when the valves 46, 48 are closed, the pressure on either side of the pistons 20, 40 is the same as in the outlet spigot 1.

If the plate valve is to be opened from this position, the solenoid valve 46 is opened. Pressure medium then flows from the chamber above the piston 20 into the lower-pressure chamber (not shown). Since the amount of pressure medium flowing through the throttle bore 42 (of smaller cross-section than the connecting line 44) is not the same, the movable valve member 23 rises to the top most position. At this time, the orifice plate 33 connects the spigots 1, 2 with a lateral clearance. In these conditions, the orifice plate 33 not only allows a through-flow of medium but also helps to provide a smooth flow between the two spigots 1, 2 and, hence, a low pressure drop.

If the plate valve is to be closed, the solenoid valve 46 is closed and the solenoid valve 48 is opened. As a result, a pressure builds up above the piston 20 while the chamber below the piston 40 is relieved of pressure. The valve member 23 thus returns to the position illustrated in FIG. 1. When this occurs, the valve 48 can be closed. Of note, gravity and the frictional forces acting between the sealing plate 27 and the sealing surface 13 prevent the valve member 23 from opening unintentionally.

Various changes may be made in the plate valve construction. For example, the cylinders 4, 5 need not be made integral with the housing. For example, referring to FIG. 3, wherein like reference characters indicate like parts as above, the servo-piston system has a pair of cylinder heads 60 disposed in diametrically opposed relation about the spigots 1, 2. Each cylinder head 60 has a flange 61 which is of substantially square shape as viewed in the direction of the cylinder axis. In addition, bores are provided in the four substantially triangular gussets of these flanges 61 in parallel with the cylinder axis through which four tie bolts extend past the inlet and outlet spigots 1, 2. These bolts serve to clamp the two cylinder heads 60 on the end faces of the valve housing which is formed of the inlet spigot, outlet spigot 2 and shells 6 (not shown).

Figure 3:
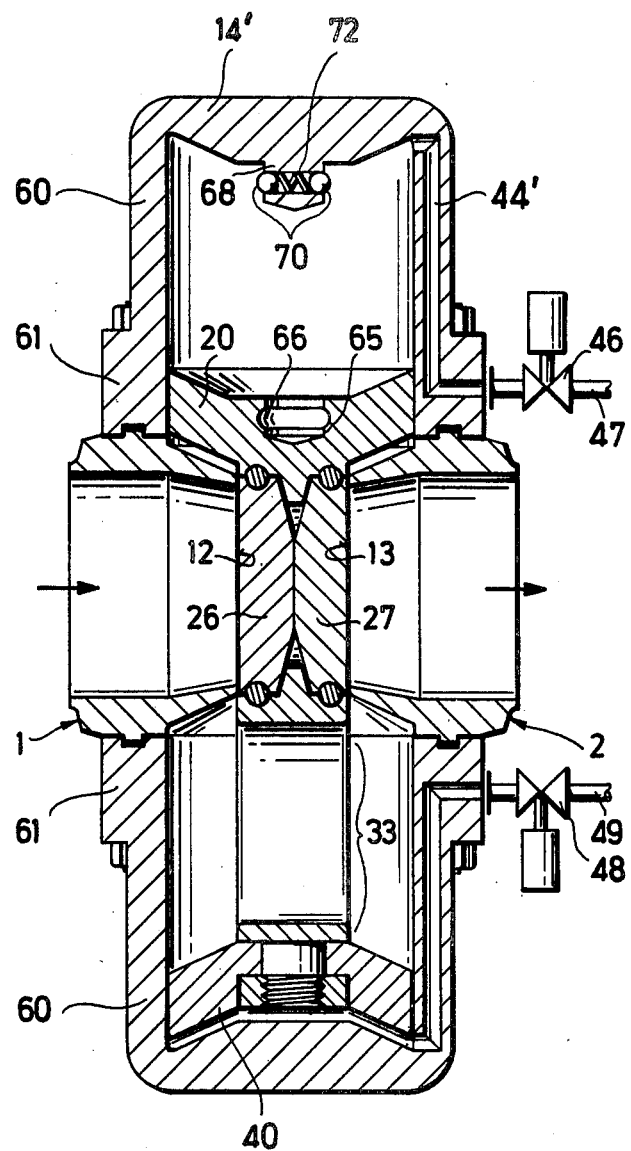
FIG. 3 illustrates an axial cross-sectional view of a modified plate valve according to the invention.

As indicated in FIG. 3, the closure plates 26, 27 may be slightly tapered relative to one another. The clearances of the plates 26, 27 in the recesses 24, 25 at the bolts 30 together with the taper of the plates 26, 27 are so selected that when the valve closes, the plates 26, 27 cannot jam on the sealing surfaces 12, 13 even if the surfaces are not bevelled.

The valve is also formed with a snap lock mechanism for releasably holding the valve member 23 in the raised position. As indicated, the snap lock mechanism includes a bore 65 having a substantially semi-circular annular groove 66 provided centrally in the piston 20. In addition, a projecting stud 68 is provided centrally on the wall 14' of the cylinder head 60. This stud 68 includes a transverse bore containing two balls 70 which are biased apart by a spring 72. The stud 68 is crimped at each end of the bore in order to prevent the balls 70 from escaping. This snap lock mechanism permits the solenoid valve 46 to be closed with the plate valve in the open position without the valve member 23 dropping by gravity. This obviates any permanent discharge of medium.

As shown in FIG. 3, the solenoid valves 46, 48 are secured on the respective flanges 61. In addition, the connecting lines 44' extend through the cylinder heads 60. Thus, the solenoid valves 46 are in a more protected position than as shown in FIG. 1. However, the solenoid valves, or at least the main parts of the valves, may be incorporated within the covers 14 of the FIG. 1 embodiment or inside the cylinder heads 60 of the FIG. 3 embodiment.

If the plate valve is disposed so that the cylinder axes extend horizontally, a snap-lock mechanism may be employed within each cylinder in order to reliably prevent an unintentional closing of the valve due to vibration.

It is to be noted that the plate valve may be modified in various ways. For example, one or more springs may be provided to act on one or other of the pistons, for example, to compensate for gravity or in order to reliably move the valve member to a safety position. An appropriate piston clearance may also be provided instead of the throttle bores 42. In this case, the piston rings may be eliminated. Further, if the piston clearance is adequate, the body of the valve member 23 formed with the recesses 24, 25 can itself act as the sealing plates 26, 27.

It is to be noted that with the construction illustrated, the surfaces of the pistons 20, 40 are highly over-dimensioned since the frictional forces to be overcome on a movement of the valve member 23 constitute only a fraction of the plate biasing pressure. The available driving force can be a multiple of the plate biasing force since the piston diameter is usually much greater than the diameter of the valve seat. As indicated in FIG. 2, each cylinder has an inside diameter larger than the maximum transverse dimension of the valve member 23.

In order to increase the operational reliability of the plate valve, the solenoid valve 46, 48 may be multiplied in a redundant arrangement as is known. In addition, in order to actuate the valve member in a pressureless state, connections for a pressurized external medium, for example, nitrogen, may be provided at the covers 14 and the cylinder heads 60.

Still further, instead of having the connecting lines 47, 49 lead to a lower-pressure chamber, the lines may lead to a higher-pressure chamber. Connections of various kinds may also be provided simultaneously for redundancy reasons.

Finally, the valve member may also be constructed in three stages by providing, in addition to the sealing plates 26, 27 and the orifice plate 33, a straight-through portion having a passage of smaller cross-section than the orifice plate 33. An appropriate snap-lock mechanism may then be used to hold the valve member in the middle one of the three positions. In this case, a logic circuit acting, for example, on the solenoid valves and influenced by a travel transmitter can be used to provide for the control of the middle position.

The invention, thus, provides a plate valve construction wherein the center of gravity of the valve together with the drive is situated close to or even on the axis of the spigots.

What is claimed is:

1. A plate valve comprising
a housing having an inlet spigot with a sealing surface and an outlet spigot with a sealing surface;
a valve member movably mounted between a closed position and an open position in said housing between and radially of said spigots, said valve member including at least one closure plate for selectively seating against one of said sealing surfaces to close said spigots from each other in said closed position and an orifice plate for selectively communicating said spigots with each other in said open position; and a servo-piston system for moving said valve member in said housing, said system including a pair of cylinders disposed in diametrically opposed relation about said spigots, a first piston disposed in one cylinder to define a first chamber and a second chamber therein, a second piston disposed in the second cylinder to define a third chamber and a fourth chamber therein, said second chamber and said third chamber communicating with said inlet spigot to receive a flowable medium therefrom, each said piston being fixed to said valve member and having a throttle bore extending therethrough to communicate said chambers in a respective cylinder with each other to conduct a throttled flow of medium therebetween, and a pair of valves, each valve selectively connecting an outlet chamber of said chambers in a respective cylinder with a pressure medium at a pressure different from the pressure of the medium in said inlet spigot whereby during movement of said valve member to said open position, one of said valves is opened to permit pressure medium to flow from said first chamber through said one valve while pressure medium flows from said second chamber into said first chamber through said throttle bore in said one piston to create a differential pressure on said one piston sufficient to move said valve member to said open position while pressure medium flows from said third chamber into said fourth chamber through said throttle bore in said second piston; and during movement of said valve member to said closed position, the other of said valves is opened to permit pressure medium to flow from said fourth chamber through said other valve while pressure medium flows from said third chamber into said fourth chamber through said throttle bore in said second piston to create a differential pressure on said second piston sufficient to move said valve member to said closed position while pressure medium flows from said second chamber into said first chamber through said throttle bore in said first piston.

2. A plate valve as set forth in claim 1 wherein each cylinder has an inside diameter larger than the maximum transverse dimension of said valve member.

3. A plate valve as set forth in claim 1 wherein said housing includes a pair of shell parts connected with said spigots and each said cylinder is a cylinder head removably mounted on said housing.

4. A plate valve as set forth in claim 1 wherein said valve member includes a pair of sealing plates, each plate being disposed coaxially of a respective spigot in said first position of said valve member.

5. A plate valve as set forth in claim 1 which further comprises at least one snap lock mechanism in said housing for releaseably holding said valve member in at least said open position.

6. A plate valve as set forth in claim 1 which further comprises a cover for each respective cylinder, a bore in each cover communicating one of said pair of valves with one of said outer chambers, a sealing surface on each side cover about said bore and a back seat on at least one piston for seating on said sealing surface on one of said respective covers.

7. A plate valve comprising a housing having an inlet spigot with a sealing surface and an outlet spigot with a sealing surface;

a valve member movably mounted between a closed position and an open position in said housing between and radially of said spigots, said valve member including at least one closure plate for selectively seating against one of said sealing surfaces to close said spigots from each other in said closed position and an orifice plate for selectively communicating said spigots with each other in said open position; and a servo-piston system for moving said valve member in said housing; said system including a pair of cylinders disposed in diametrically opposed relation about said spigots, a first piston disposed in one cylinder to define a first chamber and a second chamber therein, a second piston disposed in the second cylinder to define a third chamber and a fourth chamber therein, said second chamber and said third chamber communicating with said inlet spigot to receive a flowable medium therefrom and with said first chamber and said fourth chamber respectively to deliver the flowable medium thereto, each said piston being fixed to said valve member, and a pair of valves, each valve selectively connecting an outer chamber of said chambers in a respective cylinder with a pressure medium at a pressure different from the pressure of the medium in said inlet spigot whereby during movement of said valve member towards said open position one of said valves is opened to permit pressure medium to flow from said first chamber through said one valve while a flow of medium from said second chamber to said first chamber is throttled between said first piston and said housing to create a differential force on said first piston for moving said valve member towards said open position while pressure medium flows from said third chamber into said fourth chamber and during movement of said valve member towards said closed position a flow of medium from said third chamber to said fourth chamber is throttled between said second piston and said housing to create a differential pressure on said second piston for moving said valve member towards said closed position while pressure medium flows from said second chamber into said first chamber.

* * * * *